United States Patent [19]

Kaminski

[11] Patent Number: 5,253,889
[45] Date of Patent: Oct. 19, 1993

[54] ALL WHEEL DRIVE VEHICLE

[75] Inventor: Joseph W. Kaminski, Campbell, Calif.

[73] Assignee: Michele Chiarella, Lugano-Castagnola, Switzerland

[21] Appl. No.: 948,344

[22] Filed: Sep. 21, 1992

Related U.S. Application Data

[63] Continuation of Ser. No. 470,176, Jan. 25, 1990, abandoned.

[51] Int. Cl.⁵ .............................................. B62M 1/02
[52] U.S. Cl. .................................. 280/230; 280/259; 280/304.2; 74/417
[58] Field of Search ............... 280/230, 259, 260, 261, 280/212, 214, 223, 236, 238, 210, 241, 304.2; 74/665 GE, 417, 423, 594.2

[56] References Cited

U.S. PATENT DOCUMENTS

| | | | |
|---|---|---|---|
| 599,048 | 2/1898 | Turner | 280/214 |
| 4,479,660 | 10/1984 | Pattison | 280/261 |
| 4,713,042 | 12/1987 | Inhoff | 474/69 |
| 4,895,385 | 1/1990 | Becoat | 280/259 |
| 5,052,705 | 10/1991 | Ringle | 280/212 |
| 5,116,070 | 5/1992 | Becoat | 280/259 |
| 5,158,314 | 10/1992 | Farras Pinos | 280/259 |

FOREIGN PATENT DOCUMENTS

869824  2/1942  France ............................... 280/238

Primary Examiner—Margaret A. Focarin
Assistant Examiner—Anne Marie Boehler
Attorney, Agent, or Firm—Robert D. Schaffer

[57] ABSTRACT

An at least two-wheeled vehicle provided with a power source, a chain to transmit power from the source to a first wheel, and further device to transmit power from the first wheel to the second wheel. A torque-limiting clutch is provided in the mechanical connection between the two wheels which will predetermine the maximum torque which will be transmitted from the first wheel to the second wheel. This clutch also permits the first wheel to travel faster than the second wheel, when required. There is also provided a free-wheeling clutch in the mechanical connection between the two wheels which permits the second wheel to rotate faster than the first wheel. The core of the transmission has the ability to absorb and release torque applied to it. The present invention provides improved traction and better steering ability.

78 Claims, 6 Drawing Sheets

ALL WHEEL DRIVE VEHICLE

This is a continuation of application Ser. No. 07/470,176, filed Jan. 25, 1990, now abandoned.

The present invention is directed to an improvement in the drive means for powered vehicles, particularly two-wheeled vehicles such as bicycles.

BACKGROUND OF THE INVENTION

Bicycles of the type with which the present invention is concerned are well known. They normally have a series of gears which provide ten gear ratios at the option of the user. Certain such bicycles are particularly intended for use on rough terrain. Such "mountain bikes" are generally satisfactory, but they suffer from lack of traction, especially in mud or snow. Moreover, the steering ability of such bikes is also in need of improvement.

BRIEF DESCRIPTION OF THE PRESENT INVENTION

It is, therefore, among the objects of the present invention to improve existing mountain bicycles so that they possess better traction and improved steering ability. It is also among the objects of the present invention to provide such a bicycle by a modification of existing bicycles which does not require major reconstruction.

Although the present invention will be specifically described with relation to a bicycle, it is to be understood that it is applicable to powered vehicles of different character, including motorcycles, tricycles, mopeds, etc.

BRIEF DESCRIPTION OF THE DRAWINGS

In the accompanying drawings, constituting a part hereof and in which like reference characters indicate like parts.

DETAILED DESCRIPTION OF THE INVENTION

Figure 1:
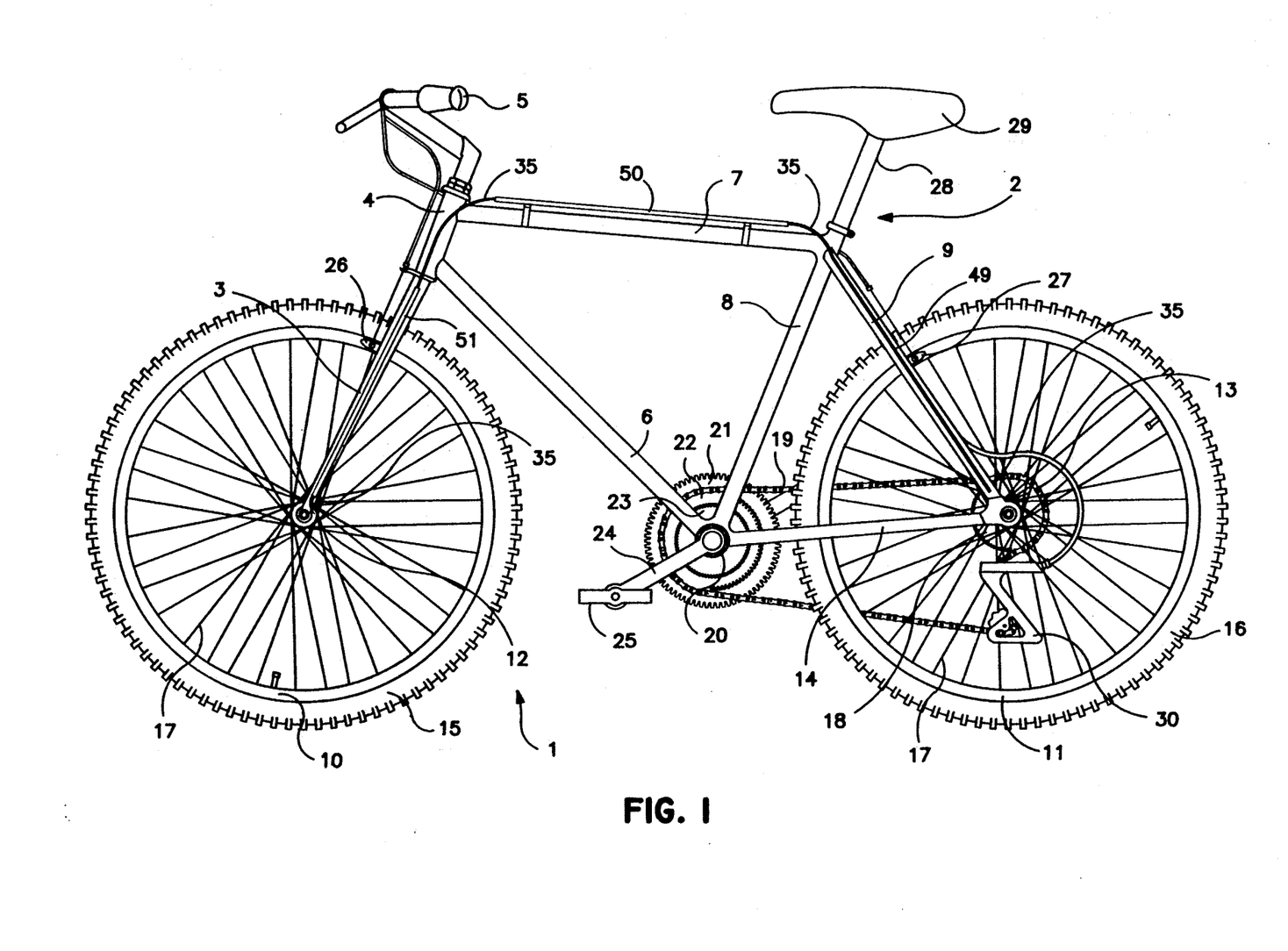
FIG. 1 is a side elevation of a bicycle equipped with the drive of the present invention.

Referring more specifically to FIG. 1, bicycle 1 comprises frame 2, front wheel 10, and rear wheel 11. Frame 2 is made up of front fork 3 pivotally mounted in head 4. Handlebars 5 are connected to fork 3 and pivot therewith. Strut 6 extends from head 4 to the bottom of vertical support 8. At this point, pivot 20 for pedal arms 24 terminating in pedals 25 is located along with large, medium, and small gears 21, 22, and 23, respectively.

Rear fork 9 extends from the upper end of vertical support 8 to rear axle 13. Also mounted on the upper end of vertical support 8 is post 28 carrying seat 29. As is customary, post 28 is slidable within vertical support 8 so that the height of seat 29 may be adjusted to suit the individual user.

As a further brace for rear wheel 11, horizontal bars 14 extend from pivot 20 and join rear fork 9 at rear axle 13. Power is transmitted from pedals 25 and pivot 20 by endless chain 19 which passes over one of gears 21, 22, and 23, around sprocket 18, and through derailleur 30. Derailleur 30 is adapted to shift chain 19 from any one of gears 21, 22, and 23 to any other of these gears. This provides the desired changes in gear ratios at the option of the user.

Wheels 10 and 11 are provided with spokes 17 and front wheel 10 carries front tire 15, while rear wheel 11 carries rear tire 16. Front brake 26 is adapted to bear against the rim of front wheel 10 and rear brake 27 bears against the rim of rear wheel 11.

Figure 2:
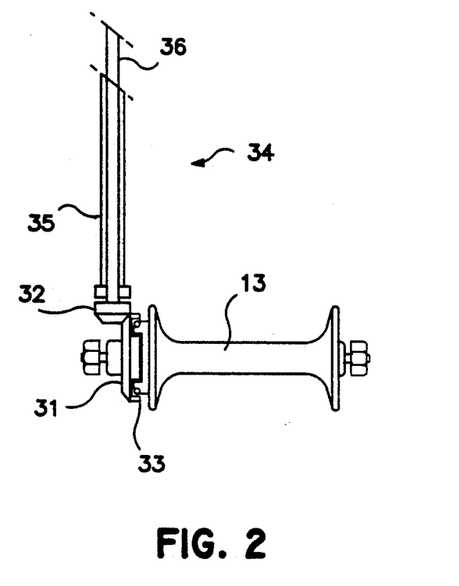
FIG. 2 is a fragmentary schematic view of the connection of the drive mechanism of the present invention to the rear wheel of a bicycle.
Figure 3:
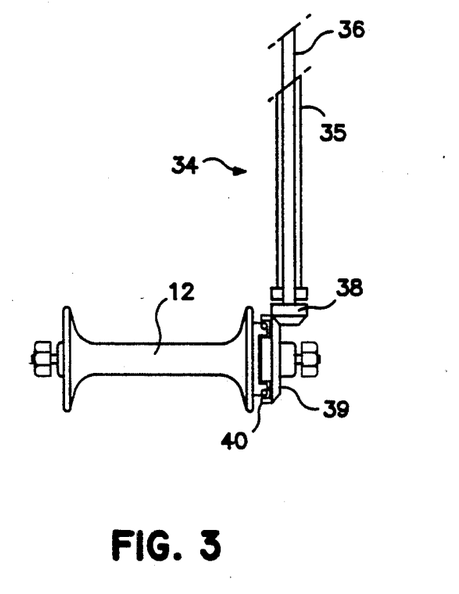
FIG. 3 is a view similar to that of FIG. 2 directed to the front wheel of the bicycle.

The present invention, in its broadest aspect, is best shown in FIGS. 2 and 3. Flexible transmission 34 comprises non rotating casing 35 which contains core 36. The latter is rotatable relative to casing 35 and is located within it. Shafts 187-49 and 250-49 produced by Suhner of Brugg, Switzerland are suitable for this purpose. On rear axle 13 is mounted torque limiting clutch 33 and driving gear 31 which, in turn, engages complementary rear driven gear 32. Advantageously, these gears are bevel gears. Torque limiting clutch 33 is designed to be preset so that it will disengage when the predetermined maximum torque is reached or exceeded.

The other end of transmission 34 is shown in FIG. 3. For convenience, transmission 34 is shown in fragmentary fashion in FIGS. 2 and 3. In actuality, however, it extends continuously from rear axle 13 (FIG. 2) to front axle 37 (FIG. 3). Power from axle 13 is transmitted through clutch 33, bevel gears 31 and 32, and core 36 to front driving gear 38. This gear meshes with front driven gear 39 which, in turn, engages front axle 12 through free-wheeling clutch 40. This clutch is intended to permit front wheel 10 to rotate faster than rear wheel 11, when necessary.

Figure 4:
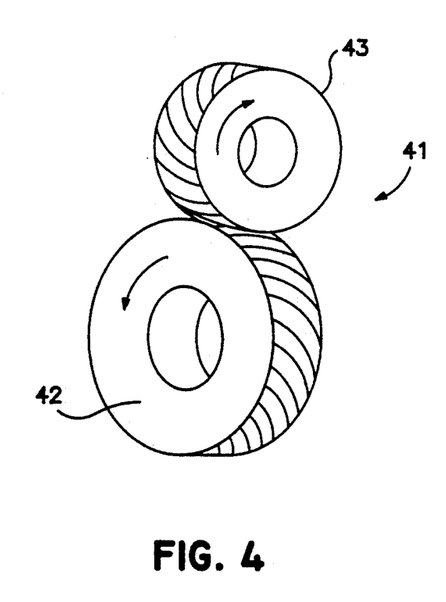
FIG. 4 is a schematic view of a pair of helical gears suitable for connecting the drive to the front or rear wheels.

Bevel gears 31, 32 and/or 38, 39 may be replaced by helical gears 41 as shown in FIG. 4. Large gear 42 is mounted on axle 13 and/or 12, while small gear 43 is fixed to—and rotates with—core 36.

Thus, the present invention provides a single power source (the pedals) which drives the rear wheel in the usual way. The rear wheel, in turn, drives the front wheel in a particular manner which will provide increased traction or "grabbing ability" of the front wheel. This also improves steering as it tends to pull the bicycle over rocks and through mud, snow, etc.

By placing each wheel of the bicycle on a separate scale and measuring the weight on each, both with and without a rider thereon, it has been determined that, on level ground, about 54% of the total weight is supported by the rear wheel. Therefore, there is more compression on the rear tire which provides an effective radius and circumference which are slightly smaller than the corresponding dimensions of the front wheel. Furthermore, use of the bicycle in this manner over a period of time will cause the rear tire to wear somewhat more than the front tire. This contributes to the difference in diameters and circumferences.

Therefore, the rear wheel will turn slightly faster than the front wheel. Since core 36 is capable of absorbing torque, the difference in rotational speeds will result in torque building up in the core itself. In essence, the core acts as an energy storage device. However, when the bicycle is turned, the front wheel travels through a longer and wider arc than does the rear wheel. In order to cover this increased distance in the same time that the rear wheel completes its turn, it is necessary for the front wheel to turn faster than the rear wheel.

In such a situation, the torque stored in core 36 causes the core to continue to drive the front wheel, even though it is turning faster than the rear wheel. As a result, there is a positive drive on the front wheel which aids in both turning and surmounting obstacles. If there is insufficient turning to relieve the torque, it will increase to a predetermined and preset point at which clutch 33 will release at least partially so as to permit slippage between the front and rear wheels. This will relieve at least some of the torque in core 36 so that it does not build up excessively. On the other hand, if the bike continues to turn, eventually all of the stored torque will have been exhausted. When this occurs, the transmission can no longer drive the front wheel faster than the rear wheel. In order to accommodate this, a free-wheeling clutch is provided between the two wheels, preferably adjacent the front axle. As is shown more specifically in FIG. 5, clutch 40 comprises driving disk 45 which is secured to the front end of core 36 of shaft 34. Driven disk 44 is provided with notches 47 and ramps 48 leading thereto.

Figure 5:
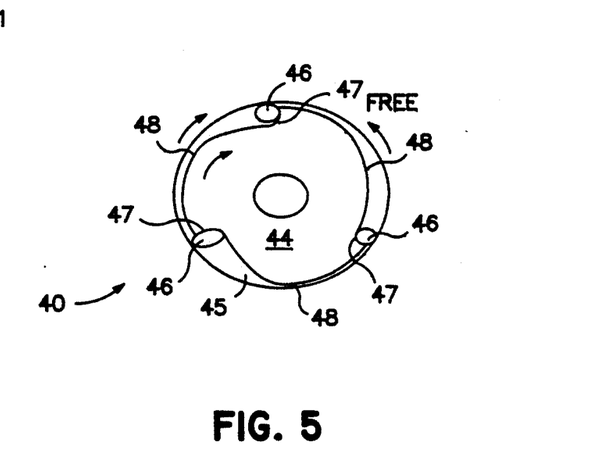
FIG. 5 is a schematic view of a free-wheeling clutch which permits the front wheel to travel faster than the rear wheel.

When front wheel 10 is being driven by rear wheel 11, driving pins 46 are in notches 47 and the power is transmitted from driving disk 45 to driven disk 44. However, when the speed of front wheel 10 (which is connected to driven disk 44) exceeds that of rear wheel 11 (to which driving disk 45 is secured), pins 46 travel up ramps 48 and simply ratchet until the speed of front wheel 10 becomes the same as that of rear wheel 11.

Since, as previously mentioned, there is more weight on the rear wheel than on the front wheel, the torque applied to the wheels is, for best results, similarly unequal. However, since this balance will change depending upon whether the bicycle is being ridden on a level, an upslope, or a downslope, clutch 33 is adjustable at the option of the rider in order to accommodate these differences. When the torque being transmitted from the rear wheel to the front wheel exceeds the desired value, the clutch releases. This will occur, as previously mentioned, if the torque on the core is permitted to build up to an excessive level.

Although it has been determined that the optimum maximum torque on the front wheel should be 40% of the total, this limitation is based upon level terrain. If the bicycle is being ridden uphill or downhill, the optimum ratio will necessarily change. Moreover, on smooth, level pavement, it is preferable to have only the rear wheel powered. Since there is no advantage to powering both wheels in this situation, and there is a mechanical loss in the power train from the rear wheel to the front wheel, the rider will probably wish to disconnect the front wheel drive entirely.

Figure 6:
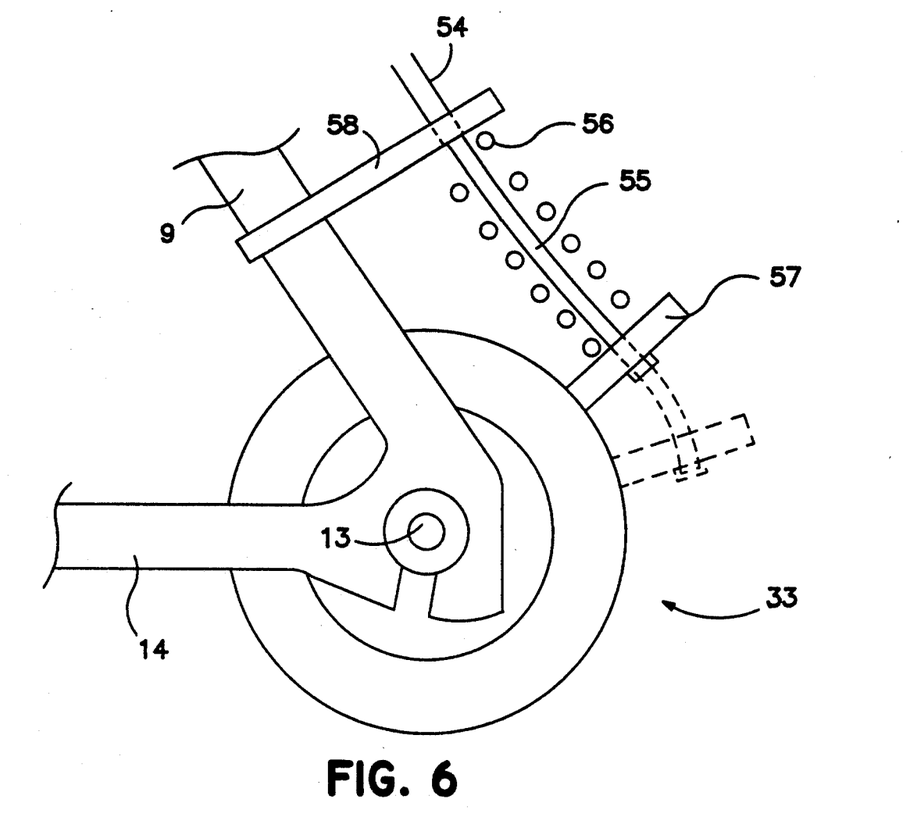
FIG. 6 is a schematic view of the rear fork showing the adjustment cable.
Figure 7:
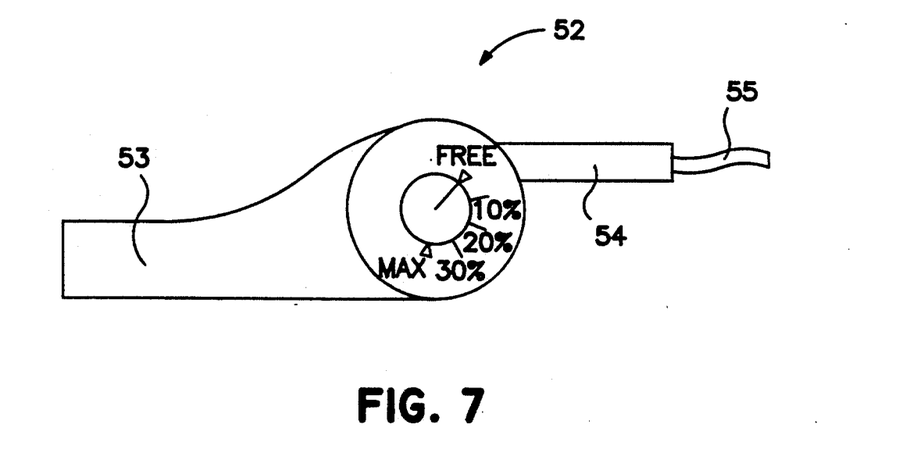
FIG. 7 is a schematic view of the mechanism for adjusting the torque limiting clutch.

In order to permit the adjustment required by the foregoing, the mechanism as shown schematically in FIGS. 6 and 7 is provided. Control 52, preferably mounted on handlebars 5, comprises handle 53, which is adapted to pull or push rod 55 within sheath 54. In a preferred form, there are specific slots or stopping points at varying degrees of torque transmission. There is also a position wherein no torque is transferred and front wheel 10 turns freely. The other end of sheath 54 is fastened to rear fork 9 by clip 58. Rod 55 extends therefrom and is secured to actuator 57 which, in turn, is mounted on clutch 33. The fully engaged position is shown in full lines, while the disengaged position is shown in broken lines.

Figure 8:
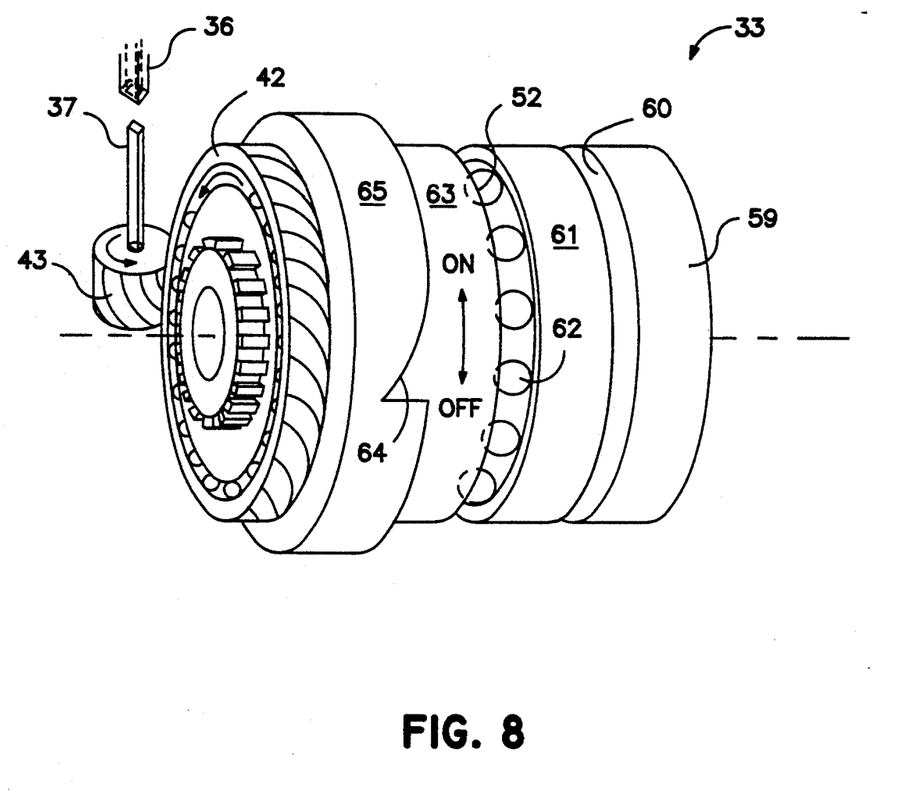
FIG. 8 is a schematic view of the torque limiting clutch.
Figure 9:
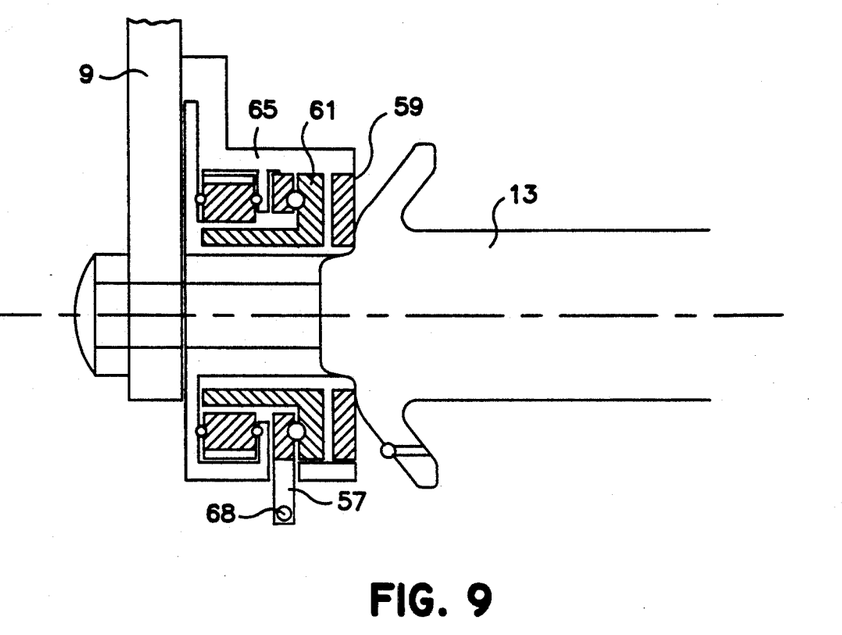
FIG. 9 is a partial cross section of the torque limiting clutch.
Figure 10:
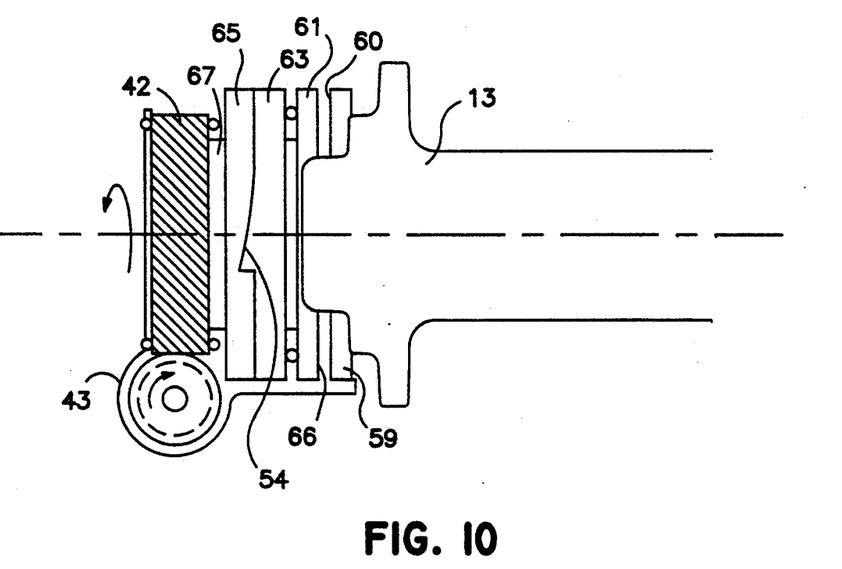
FIG. 10 is a view similar to FIG. 9 with the clutch not in section.

Torque limiting clutch 33 is shown in greater detail in FIGS. 8, 9, and 10. Driving plate 59 is fixedly mounted on rear axle 13 and driving face 60 is adapted to engage driven face 66 of driven plate 61. Thrust bearings 62 are provided between driven plate 61 and control ring 63.

Housing 65 has at least one slope 64 to which control ring 63 is complementary. Driven plate 61 is unitary with, or fixedly mounted to, shaft 67. At the other end of shaft 67, large gear 42 is fixed. This, in turn, drives small gear 43 and connection 37. The last is adapted to be received by core 36 and to impart rotation thereto.

When it is desired to disconnect the front wheel drive, lever 53 is moved to the position indicated in FIG. 7. Rod 55 is extended and actuator 57 is in the position shown in dotted lines in FIG. 6. This corresponds to the position shown in FIG. 8. Control ring 63 and driven plate 61 are at their extreme left position as shown in that figure. Therefore, driving face 60 and driven face 66 are not in contact and there is no torque transmitted to the rest of the clutch and to the front wheel.

When front wheel drive is desired, lever 53 is moved to a position which at least partially retracts rod 55. This moves actuator 57 toward the solid line position in FIG. 6. When this occurs, control ring 63 rotates in the ON direction as shown in FIG. 8. Slope 64 forces control plate 63 against thrust bearings 62 which, in turn, move driven plate 61 toward driving plate 59 so that driving face 60 is in contact with driven face 66. By adjusting the degree of withdrawal of rod 55, the amount of rotation of control ring 63 is increased or decreased. As it increases, the pressure between faces 60 and 66 also increases, providing for transmission of a greater percentage of torque to gears 42, 43, connection 37, core 36 and thence to front wheel 10. Thus, by this simple mechanism, excellent control of the front wheel drive is obtained.

Figure 11:
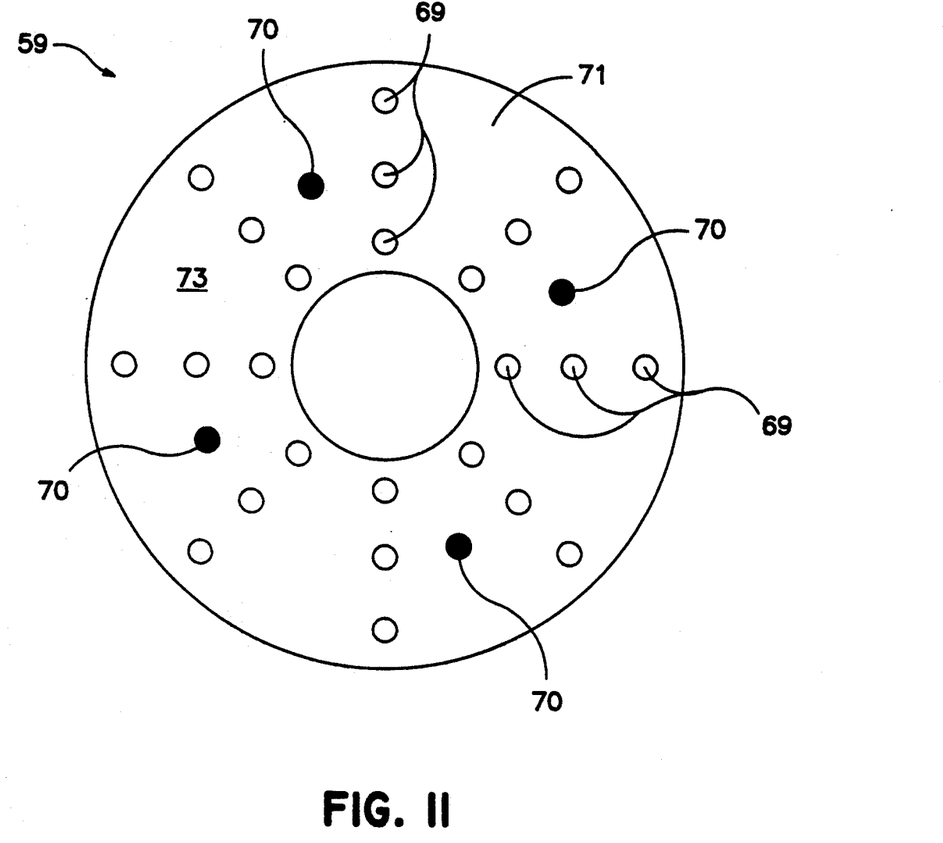
FIG. 11 is an end view of one portion of a modification of the torque limiting clutch.
Figure 12:
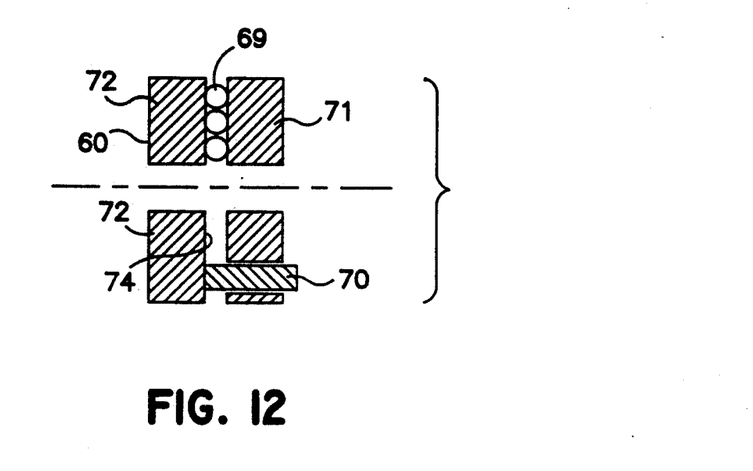
FIG. 12 is a cross sectional view of a composite embodiment of the driving plate.

It is preferred that driving plate 59 be a composite element as shown in FIGS. 11 and 12. Axle plate 71 is secured to rear axle 13 by dowels 70. Silicone 69 provides resilience to the clutch and makes transition from various settings smoother. Clutch plate 72, having driving face 60, is pressed tightly against axle plate 71 to form driving plate 59, as shown more specifically in FIG. 12.

In order to minimize the torque on core 36, it has been found advantageous to establish a substantial gear ratio between axle 13 and core 36. This is accomplished by making driving gear 31 much larger than driven gear 32. This causes core 36 to rotate at a higher speed than axle 13, thus reducing the torque on core 36. A ratio of gear 31 to gear 32 of approximately 5 to 1 is preferred.

At the other end, driving gear 38 is smaller than driven gear 39. In fact, for best operation, the gear ratio between gears 38 and 39 should be the exact inverse of that between gears 31 and 32. However desirable this may be, it is not absolutely essential since clutches 33 and 40 can release if one wheel is to move faster than the other.

In a further modification of the present device, the drive between the rear and front wheels is partially enclosed in a rigid, rather than flexible casing. As shown more particularly in FIG. 1, rear rigid section 49, center rigid section 50, and front rigid section 51 are mounted on rear fork 9, upper bar 7, and front fork 3, respectively. Gaps are left between successive rigid sections in order to permit changes in the angles of the flexible portion of the drive mechanism. In addition, rigid sections 49 and 51 are terminated short of axles 13 and 12 in order to provide the necessary flexibility at these points. This is of particular importance to facilitate the demounting of the wheels.

While only a limited number of specific embodiments of the present invention have been expressly disclosed, it is, nonetheless, to be broadly construed and not to be limited except by the character of the claims appended hereto.

I claim:

1. A vehicle having a power source for producing a total torque, having at least a first wheel and a second wheel, the first wheel being rotatable about a first axle and the second wheel being rotatable about a second axle, the power source being remote from the first axle and the second axle, wherein the vehicle comprises:
   a first power train for conveying power from the power source to the first wheel and a second power train for conveying power from the first wheel to the second wheel, wherein
   said first power train comprises a first transmission engaged by the power source and for engaging the first wheel, and wherein said second power train comprises a second transmission engaged by the first wheel and for engaging the second wheel; and
   wherein said second power train further comprises a torque limiting clutch adapted for releasing when driving torque applied thereto exceeds a predetermined value, and wherein said clutch is adjustable for varying said value when the vehicle is moving.

2. The vehicle of claim 1 wherein said second power train comprises a free wheeling clutch whereby said second wheel is capable of rotating faster than said first wheel.

3. The vehicle of claim 2 wherein said free wheeling clutch is adjacent said second axle.

4. The vehicle of claim 1 wherein said torque limiting clutch is adjacent said first axle.

5. The vehicle of claim 1 wherein said second wheel is turnable about an axis perpendicualr to said second axle.

6. The vehicle of claim 1 wherein said second transmission is engaged by said first wheel at a first connection adjacent said first axle,
   said first connection comprising a first driving gear mounted on said first wheel and rotatable therewith, a first driven gear mounted on said second transmission and rotatable therewith, said first driving gear engaging said first driven gear.

7. The vehicle of claim 6 wherein said first driving gear and said second driving gear are bevel gears.

8. The vehicle of claim 6 wherein said first driving gear and said first driven gear are helical gears.

9. The vehicle of claim 6 wherein said first driving gear is larger than said first driven gear, whereby said first driven gear rotates faster than said first driving gear.

10. The vehicle of claim 9 wherein the ratio of speed of rotation of said first driven gear to that said first driving gear is approximately 5 to 1.

11. The vehicle of claim 9 wherein said second transmission engages said second wheel at a second connection adjacent said second axle,
    said second connection comprising a second driving gear mounted on said second transmission and rotatable therewith, a second driven gear mounted on said second wheel and rotatable therewith, said second driving gear engaging said second driven gear,
    said second driving gear being smaller than said second driven gear, whereby said second driven gear rotates slower than said second driving gear,
    the ratio of speed of rotation of said first driving gear to that of said first driven gear being substantially the same as the ratio of speed of rotation of said second driven gear to that of said second driving gear.

12. The vehicle of claim 11 wherein said ratio is about 5 to 1.

13. The vehicle of claim 11 wherein said ratio of speed of rotation of said first driving gear to that of said first driven gear and said ratio of speed of rotation of said second driving gear to said second driven gear are complementary.

14. The vehicle of claim 1 wherein said second transmission engages said second wheel at a second connection adjacent said second axle,
    said second connection comprising a second driving gear mounted on said second transmission and rotatable therewith, a second driven gear mounted on said second wheel and rotatable therewith, said second driving gear engaging said second driven gear.

15. The vehicle of claim 14 wherein said second driving gear and said second driven gear are bevel gears.

16. The vehicle of claim 14 wherein said second driving gear and said second driven gear are helical gears.

17. The vehicle of claim 14 wherein said second driving gear is smaller than said second driven gear, whereby said second driven gear rotates slower than said second driving gear.

18. The vehicle of claim 17 wherein the ratio of speed of rotation of said second driving gear to that of said second driven gear is approximately 1 to 5.

19. The vehicle of claim 1 wherein said second transmission comprises a flexible, substantially stationary, substantially tubular casing having a flexible core therein, said core being rotatable with respect to said casing.

20. The vehicle of claim 19 wherein said core is adapted to absorb and release torque applied thereto.

21. The vehicle of claim 1 wherein said first transmission comprises an endless chain of links, wherein each of said links has an opening therethrough, a sprocket mounted on said first wheel and engaging said chain through said holes.

22. The vehicle of claim 1 wherein a portion of said second transmission is rigid and part of said second transmission is flexible.

23. The vehicle of claim 1 wherein said second wheel is in front of said first wheel.

24. The vehicle of claim 23 wherein said first wheel and said second wheel are substantially in tandem.

25. The vehicle of claim 1 wherein said value is not greater than a load limit of said second power train.

26. A vehicle having a power source for producing a total torque, having at least a first wheel and a second wheel, the first wheel being rotatable about a first axle and the second wheel being rotatable about a second axle, the power source being remote from the first axle and the second axle, the second wheel being turnable about an axis perpendicular to the second axle, wherein the vehicle comprises:

a first power train for conveying power from the power source to the first wheel, and a second power train for conveying power from the first wheel to the second wheel, wherein said first power train comprises a first transmission engaged by the power source and for engaging the first wheel, and wherein said second power train comprises a second transmission engaged by the first wheel and for engaging the second wheel; and wherein said second power train further comprises a torque limiting clutch adapted for releasing when driving torque applied thereto exceeds a predetermined value, and wherein said clutch is adjustable for varying said value while the vehicle is moving.

27. The vehicle of claim 26 wherein said second power train comprises a free wheeling clutch whereby said second wheel is capable of rotating faster than said first wheel.

28. The vehicle of claim 26 wherein said torque limiting clutch is adjacent said first axle.

29. The vehicle of claim 26 wherein said second transmission is engaged by said first wheel at a first connection adjacent said first axle, said first connection comprising a first driving gear mounted on said first wheel and rotatable therewith, a first driven gear mounted on said second transmission and rotatable therewith, said first driving gear engaging said first driven gear.

30. The vehicle of claim 29 wherein said first driving gear and said second driving gear are bevel gears.

31. The vehicle of claim 29 wherein said first driving gear and said first driven gear are helical gears.

32. The vehicle of claim 26 wherein said second transmission engages said second wheel at a second connection adjacent said second axle, said second connection comprising a second driving gear mounted on said second transmission and rotatable therewith, a second driven gear mounted on said second wheel and rotatable therewith, said second driving gear engaging said second driven gear.

33. The vehicle of claim 32 wherein said second driving gear and said second driven gear are helical gears.

34. The vehicle of claim 32 wherein said second driving gear is smaller than said second driven gear, whereby said second driven gear rotates slower than said second driving gear.

35. The vehicle of claim 34 wherein the ratio of speed of rotation of said second driving gear to that of said second driven gear is approximately 1 to 5.

36. The vehicle of claim 32 wherein said second driving gear and said second driven gear are bevel gears.

37. The vehicle of claim 26 wherein said first driving gear is larger than said first driven gear, whereby said first driven gear rotates faster than said first driving gear.

38. The vehicle of claim 37 wherein the ratio of speed of rotation of said first driven gear to that said first driving gear is approximately 5 to 1.

39. The vehicle of claim 37 wherein said second transmission engages said second wheel at a second connection adjacent said second axle, said second connection comprising a second driving gear mounted on said second transmission and rotatable therewith, a second driven gear mounted on said second wheel and rotatable therewith, said second driving gear engaging said second driven gear, said second driving gear being smaller than said second driven gear, whereby said second driven gear rotates slower than said second driving gear, the ratio of speed of rotation of said first driving gear to that of said first driven gear being substantially the same as the ratio of speed of rotation of said second driven gear to that of said second driving gear.

40. The vehicle of claim 39 wherein said ratio is about 5 to 1.

41. The vehicle of claim 39 wherein said ratio of speed of rotation of said first driving gear to that of said first driven gear and said ratio of speed of rotation of said second driving gear to said second driven gear are complementary.

42. The vehicle of claim 26 wherein said second transmission comprises a flexible, substantially stationary, substantially tubular casing having a flexible core therein, said core being rotatable with respect to said casing.

43. The vehicle of claim 42 wherein said core is adapted to absorb and release torque applied thereto.

44. The vehicle of claim 26 wherein said first transmission comprises an endless chain of links, wherein each of said links has an opening therethrough, a sprocket mounted on said first wheel and engaging said chain through said holes.

45. The vehicle of claim 26 wherein a portion of said second transmission is rigid and part of said second transmission is flexible.

46. The vehicle of claim 26 wherein said second wheel is in front of said first wheel.

47. The vehicle of claim 46 wherein said first wheel and said second wheel are substantially in tandem.

48. The vehicle of claim 26 wherein said value is not greater than a load limit of said second power train.

49. The vehicle of claim 27 wherein said free wheeling clutch is adjacent said second axle.

50. A vehicle having a power source for producing a total torque, having at least a first wheel and a second wheel, the first wheel being rotatable about a first axle and the second wheel being rotatable about a second axle, the power source being remote from the first axle and the second axle, the second wheel being in front of the first wheel, wherein the vehicle comprises:

a first power train for conveying power from the power source to the first wheel, and a second power train for conveying power from the first wheel to the second wheel, wherein said first power train comprises a first transmission engaged by the power source and for engaging the first wheel, wherein said second power train comprises a second transmission engaged by the first wheel and for engaging the second wheel; and wherein said second power train further comprises a torque limiting clutch adapted for releasing when driving torque applied thereto exceeds a predetermined value, and wherein said clutch is adjustable for varying said value while the vehicle is moving.

51. The vehicle of claim 50 wherein said first wheel and said second wheel are in tandem.

52. The vehicle of claim 50 wherein said second power train comprises a free wheeling clutch whereby said second wheel is capable of rotating faster than said first wheel.

53. The vehicle of claim 52 wherein said free wheeling clutch is adjacent said second axle.

54. The vehicle of claim 50 wherein said torque limiting clutch is adjacent said first axle.

55. The vehicle of claim 50 wherein said second transmission is engaged by said first wheel at a first connection adjacent said first axle, said first connection comprising a first driving gear mounted on said first wheel and rotatable therewith, a first driven gear mounted on said second transmission and rotatable therewith, said first driving gear engaging said first driven gear.

56. The vehicle of claim 55 wherein said first driving gear and said second driving gear are bevel gears.

57. The vehicle of claim 55 wherein said first driving gear and said first driven gear are helical gears.

58. The vehicle of claim 55 wherein said first driving gear is larger than said first driven gear, whereby said first driven gear rotates faster than said first driving gear.

59. The vehicle of claim 56 wherein the ratio of speed of rotation of said first driven gear to that said first driving gear is approximately 5 to 1.

60. The vehicle of claim 58 wherein said second transmission engages said second wheel at a second connection adjacent said second axle, said second connection comprising a second driving gear mounted on said second transmission and rotatable therewith, a second driven gear mounted on said second wheel and rotatable therewith, said second driving gear engaging said second driven gear, said second driving gear being smaller than said second driven gear, whereby said second driven gear rotates slower than said second driving gear, the ratio of speed of rotation of said first driving gear to that of said first driven gear being substantially the same as the ratio of speed of rotation of said second driven gear to that of said second driving gear.

61. The vehicle of claim 60 wherein said ratio is about 5 to 1.

62. The vehicle of claim 60 wherein said ratio of speed of rotation of said first driving gear to that of said first driven gear and said ratio of speed of rotation of said second driving gear to said second driven gear are complementary.

63. The vehicle of claim 50 wherein said second transmission engages said second wheel at a second connection adjacent said second axle, said second connection comprising a second driving gear mounted on said second transmission and rotatable therewith, a second driven gear mounted on said second wheel and rotatable therewith, said second driving gear engaging said second driven gear.

64. The vehicle of claim 63 wherein said second driving gear and said second driven gear are bevel gears.

65. The vehicle of claim 63 wherein said second driving gear and said second driven gear are helical gears.

66. The vehicle of claim 63 wherein said second driving gear is smaller than said second driven gear, whereby said second driven gear rotates slower than said second driving gear.

67. The vehicle of claim 66 wherein the ratio of speed of rotation of said second driving gear to that of said second driven gear is approximately 1 to 5.

68. The vehicle of claim 50 wherein said second transmission comprises a flexible, substantially stationary, substantially tubular casing having a flexible core therein, said core being rotatable with respect to said casing.

69. The vehicle of claim 68 wherein said core is adapted to absorb and release torque applied thereto.

70. The vehicle of claim 50 wherein said first transmission comprises an endless chain of links, wherein each of said links has an opening therethrough, a sprocket mounted on said first wheel and engaging, said chain through said holes.

71. The vehicle of claim 50 wherein a portion of said second transmission is rigid and part of said second transmission is flexible.

72. The vehicle of claim 50 wherein said value is not greater than a load limit of said second power train.

73. A vehicle having a power source for producing a total torque, having at least a first wheel and a second wheel, the first wheel being rotatable about a first axle and the second wheel being rotatable about a second axle, the power source being remote from the first axle and the second axle, wherein the vehicle comprises:

a first power train for conveying power from the power source to the first wheel and a second power train for conveying power from the first wheel to the second wheel, wherein said first power train comprises a first transmission engaged by the power source and for engaging the first wheel, and wherein said second power train comprises a second transmission engaged by the first wheel and for engaging the second wheel; and wherein said second power train further comprises a torque limiting clutch adapted for releasing when driving torque applied thereto exceeds a predetermined value, wherein said value does not exceed 40% of the total torque when the vehicle is running on level ground.

74. A vehicle having a power source for producing a total torque, having at least a first wheel and a second wheel, the first wheel being rotatable about a first axle and the second wheel being rotatable about a second axle, the power source being remote from the first axle and the second axle, wherein the vehicle comprises:

a first power train for conveying power from the power source to the first wheel and a second power train for conveying power from the first wheel to the second wheel, wherein said first power train comprises a first transmission engaged by the power source and for engaging the first wheel, and wherein said second power train comprises a second transmission engaged by the first wheel and for engaging the second wheel; wherein said second power train is adapted for moving between an operative position and an inoperative position, and wherein said second power train further comprises a torque limiting clutch adapted for releasing when driving torque applied thereto exceeds a predetermined value; and a control means operatively connected to said second power train, wherein said control means is adapted for moving said second power train between said operative position and said inoperative position.

75. A vehicle having a power source for producing a total torque, having at least a first wheel and a second wheel, the first wheel being rotatable about a first axle and the second wheel being rotatable about a second axle, the power source being remote from the first axle and the second axle, the second wheel being turntable about an axis perpendicular to the second axle, wherein the vehicle comprises:

a first power train for conveying power from the power source to the first wheel, and a second power train for conveying power from the first wheel to the second wheel, wherein said first power train comprises a first transmission engaged by the power source and for engaging the first wheel, wherein said second power train comprises a second transmission engaged by the first wheel and for engaging the second wheel; and wherein said second power train further comprises a torque limiting clutch adapted for releasing when driving torque applied thereto exceeds a predetermined value, wherein said value does not exceed 40% of the total torque when the vehicle is running on level ground.

76. A vehicle having a power source for producing a total torque, having at least a first wheel and a second wheel, the first wheel being rotatable about a first axle and the second wheel being rotatable about a second axle, the power source being remote from the first axle and the second axle, the second wheel being turntable about an axis perpendicular to the second axle, wherein the vehicle comprises:

a first power train for conveying power from the power source to the first wheel, and a second power train for conveying power from the first wheel to the second wheel, wherein said first power train comprises a first transmission engaged by the power source and for engaging the first wheel, and wherein said second power train comprises a second transmission engaged by the first wheel and for engaging the second wheel, wherein said second power train is adapted for moving between an operative position and an inoperative position, wherein said second power train further comprises a torque limiting clutch adapted for releasing when driving torque applied thereto exceeds a predetermined value; and a control means operatively connected to said second power train, wherein said control means is adapted for moving said second power train between said operative position and second inoperative position.

77. A vehicle having a power source for producing a total torque, having at least a first wheel and a second wheel, the first wheel being rotatable about a first axle and the second wheel being rotatable about a second axle, the power source being remote from the first axle and the second axle, the second wheel being in front of the first wheel, wherein the vehicle comprises:

a first power train for conveying power from the power source to the first wheel, and a second power train for conveying power from the first wheel to the second wheel, wherein said first power train comprises a first transmission engaged by the power source and for engaging the first wheel, wherein said second power train comprises a second transmission engaged by the first wheel and for engaging the second wheel, and wherein said second power train further comprises a torque limiting clutch adapted for releasing when driving torque applied thereto exceeds a predetermined value, wherein said value does not exceed 40% of the total torque when the vehicle is running on level ground.

78. A vehicle having a power source for producing a total torque, having at least a first wheel and a second wheel, the first wheel being rotatable about a first axle and the second wheel being rotatable about a second axle, the power source being remote from the first axle and the second axle, the second wheel being in front of the first wheel, wherein the vehicle comprises:

a first power train for conveying power from the power source to the first wheel, and a second power train for conveying power from the first wheel to the second wheel, wherein said first power train comprises a first transmission engaged by the power source and for engaging the first wheel, and wherein said second power train comprises a second transmission engaged by the first wheel and for engaging the second wheel, wherein said second power train is adapted for moving between an operative position and an inoperative position, and wherein said second power train further comprises a torque limiting clutch adapted for releasing when driving torque applied thereto exceeds a predetermined value; and a control means operatively connected to said second power train, wherein said control means is adapted for moving said second power train between said operative position and said inoperative position.

* * * * *